Patented Jan. 5, 1932

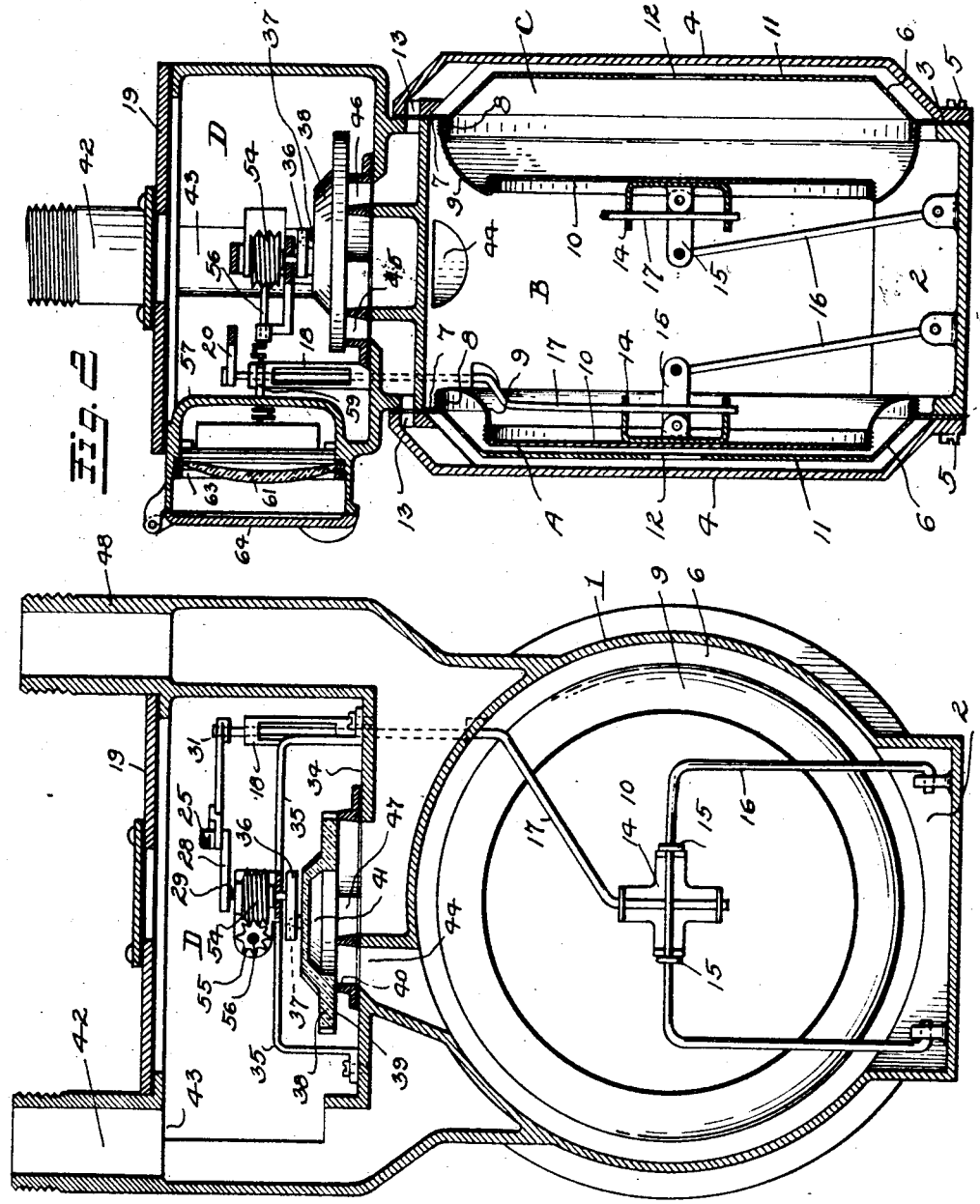

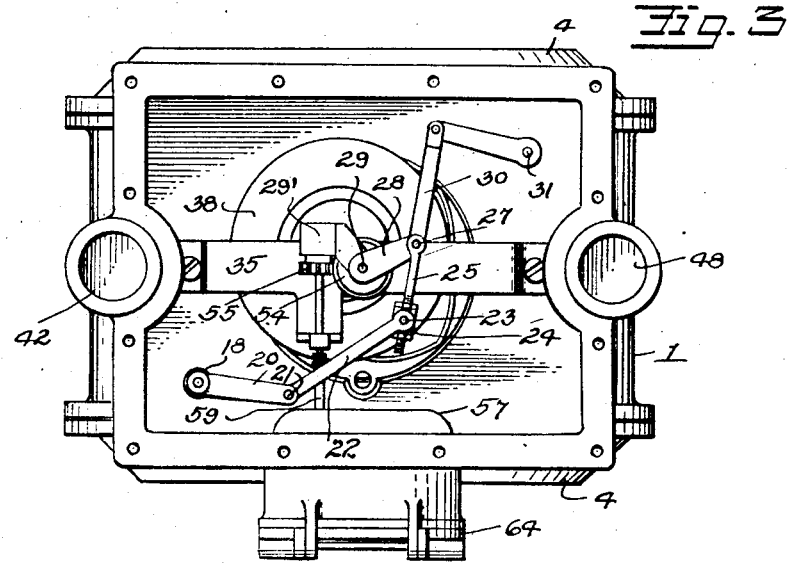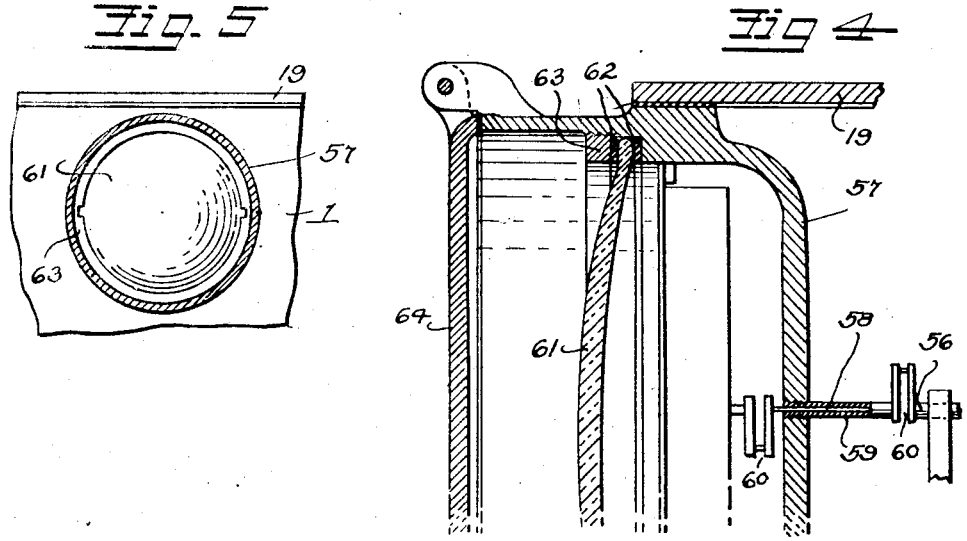

1,840,218

UNITED STATES PATENT OFFICE

HOMER J. WADDELL, OF BALTIMORE, OHIO, ASSIGNOR, BY MESNE ASSIGNMENTS, TO THE METER PARTS COMPANY, A CORPORATION OF OHIO

GAS METER

Application filed September 20, 1927. Serial No. 220,805.

This invention relates to improvements in gas meters, and has for an outstanding object the provision of a gas meter wherein the diaphgram actuated parts thereof are so mounted and arranged that friction between such relatively removable parts is minimized and a meter provided which operates freely and accurately when responding to relatively low applied gas pressures.

There is a decided tendency at the present time on the part of gas companies to employ larger gas mains with low operating pressures, three ounces of pressure per square inch being commonly used in many localities, particularly where natural gas is handled. This condition exists because of the fact that certain economies are present over systems employing higher pressures such as, for example, smaller or more lightly loaded pump and valve equipment, reduction in gas losses by leaks and the like, greater convenience in maintenance and other advantages now understood in the art. The ordinary gas meter of the so called "iron case" type as contrasted with the "tin case" or Glover type of meter, is provided with a multiplicity of packing glands or stuffing boxes which surround the flag and index shafts of the meter to prevent the seepage of gas from the gas receiving chambers of a meter to the atmosphere or other sealed chambers of the meter. These stuffing boxes or glands place considerable friction on the shafts and therefore require relatively high pressure to operate the meter and secure adequate pressure on the outlet thereof.

Therefore, the present invention provides a meter wherein these stuffing boxes or packing glands have been eliminated for the purpose of reducing friction to a minimum and to permit of the use of low operating gas pressure without sensible diminution of such pressure in the outlet of the meter.

Another object of the invention resides in the provision of a gas meter of accurate and simple construction, of large capacity, convenient to assemble and repair and which can be manufactured at a reasonable cost.

For a further understanding of the invention reference is to be had to the following description and accompanying drawings, wherein:

Figure 1 is a vertical sectional view taken transversely through a gas meter formed in accordance with the present invention, Figure 2 is a longitudinal sectional view taken through the meter, the plane of which being at right angles to the plane of the view shown in Figure 1, Figure 3 is a top plan view of the meter comprising the present invention, Figure 4 is an enlarged vertical sectional view taken through the index housing, Figure 5 is a front elevation of the index.

Referring more particularly to the drawings, the numeral 1 designates the main body of the meter, which is the form of an annular casting and is constructed to include an enlarged chamber 2 in the base thereof. The chamber is provided with open ends terminating adjacent to the flat vertical sides 3 of the body. Screwed or otherwise removably secured to the sides 3 are end plates or covers 4—4, which have their marginal edges provided with flanges which flatly engage the flanges constituting the sides 3. Screws or the like 5 are used to retain the plates 4 in engagement with the sides 3.

In this instance the diaphragms 6 have their peripheral proportions clamped between the sides 3 and the plates 4 and serve to divide the lower part of the meter into gas measuring chambers which are designated by the letters A, B, and C.

Each of the diaphragms consists of an outer metallic ring 7 which is formed to include an annular flange 8 disposed adjacent to the wall of the chamber B. To this flange there is secured the crimped, flexible leather section 9, and the inner edge of the section 9 of each diaphragm is rigidly secured to an inner movable metallic diaphragm section 10, which is adapted to reciprocate back and forth in response to gas pressures applied to the opposite sides thereof.

An important feature of the present invention resides in extending the outer metallic part 7 of the diaphragm to include a divisional wall 11, which is situated between the plate 4 and the inner section 10 of the diaphragm when the latter reaches its extreme outward position of travel. The wall 11 is formed with an axial opening 12, and it will be seen, by reference to Figure 2, that when the gas enters the meter by way of a port 13 formed in each of the plates 4, the gas travels between the wall 11 and the plates 4 and then into contact with the diaphragm by way of the opening 12. In other words, the gas is admitted into the chamber A of the diaphragm and expelled therefrom by way of the opening 12, producing the pulsating movement of the inner section 10 of each diaphragm. This construction is produced in order that the gas entering the chambers A or C will be so directed that any foreign matter entrained in the gas, such as a thick, gummy, plastic residue, will be confined in the space formed between the walls 11 and the plates 4, and prevented from entering the meter into direct contact with the flexible leather sections of the diaphragms. This residue has been found to produce a distinctly deleterious action on the perishable leather portion of the diaphragm, and by use of the present invention this residue is kept away from the diaphragm and deposited where it can be conveniently removed from time to time. In addition, the walls 11 protect the leather sections of the diaphragm from the effect of heat particularly, the construction serving to provide a double walled protection which enables the leather to maintain a desired operating temperature. By removing the end plates 4—4 it will be seen that the diaphragm structure of the meter and the accumulated residue deposit may be removed from the meter conveniently.

Mounted centrally upon each of the sections 10 and located within the chamber B is a bracket 14 of substantially cross shaped form, to the horizontal arms of which there is connected a pair of links 15 which, in turn, are connected with the horizontal rung of a pivoted bail 16, which has its spaced lower ends pivotally mounted in connection with bearings formed in the bottom of the case. The bail 16 serves to support the inner section of each diaphragm and to provide for its regulated and uniform movement in a manner customary to devices of this character.

The vertical legs of each of the brackets 14 are provided with registering openings for the reception of the lower crank shaped extensions of the flag arms 17. These arms extend upwardly through plain bearings 18 formed in the body 1, the bearings 18 do not, however, include stuffing boxes or packing glands, as has been customary in the past. The upper ends of the flag arms terminate within a linkage compartment D provided in the extreme upper part of the meter. This compartment is rendered accessible by an opening formed in the top of the meter and which is closed by a removable top plate 19, said top plate being securely applied to prevent gas seepage from the meter. By removing the top plate, however, the linkage of the meter may be adjusted, this being accomplished after gas flow through the meter has been arrested.

Connected with the upper end of one of the flag arms 17 is a crank 20, to the outer end of which is pivotally connected at 21 a second link 22. This link has its other end trunnioned as at 23 upon an adjustable collar 24, which is movable upon a screw link 25, and the operating positions of the collar 24 may be governed by adjusting binding nuts, which are mounted upon the threaded portion of the link 25 and which admit of longitudinal movement of the collar to control the rotation of a valve stem hereinafter described. The screw link 25 is pivotally connected as at 27 with a tangent arm 28, the later being fixed upon the upper end of a valve operating shaft 29. Also pivotally connected with the tangent arm 28, in alignment with pivotal connection 27 is a link 30, which has its other end connected, in turn, with the second flag arm crank 31.

It will be seen that as the diaphragm moves forwardly and backwardly in reciprocal directions oscillatory motion is imparted as usual to the flag arms 17. These arms are provided with lower crank extremities of the maximum length in order that augmented leverage will be given the diaphragms to overcome any frictional resistance which may be set up by reason of the bearings 18. The oscillatory motion imparted to the flag arms is so proportioned, as well as the linkage connecting the same with the tangent arm 28, that such oscillatory motion of said flag arms results in complete or full rotary movement on the part of said tangent arm and consequently the valve shaft or stem 29. The upper end of the shaft 29 is carried in the bracket 29' arranged within the compartment D.

Disposed in the lower part of the compartment D and resting upon the bottom wall 34 thereof is a strip 35, which acts as a journal for the stem 29. The lower end of the shaft 29 is provided with a crank arm 36, and the outer end of this crank arm is provided with a recess in which is received an axial stud 37 arising from a glass valve disk 38. This disk is of the usual type provided in connection with the rotary valve gas meters, and includes a flat lower surface 39, which rests upon a partitioned valve spider 40. This disk 38 also includes an internal centrally located pocket 41. As is customary in valves of this type, the operation of the crank 36 results in imparting an eccentric rotary motion to the valve disk, moving the latter successively across the valve ports of the spider 40 which movement, in turn, controls the inflow and exhausting gas from the measuring chambers A, B and C in a manner well known to those skilled in the art.

The body 1 is provided with the usual upright gas inlet conduit 42, which enters the compartment D by way of the port 43. In this manner the compartment D, during the normal operation of the meter, is constantly filled with gas or other fluid under measurement. It will be seen by the rotary movement of the disk 38 there will be accomplished at regularly timed intervals the opening of a port 44 which establishes communication between the compartment D and the compartment or middle chamber B of the meter, permitting the latter to receive a regulated supply of gas. Similarly, the rotation of the disk uncovers channels 45 and 46 which are employed to establish communication between the chambers A and C and the chamber D, permitting gas also to flow from the compartment D to the chambers A and C. Further, due to the provision of the pocket 41 in the valve disk and to the eccentric motion of said disk the port 44 and the channels 45 and 46 will be successively registered with a channel 47 which leads from said pocket to the outlet conduit 48 of the meter.

By this arrangement gas is successively led into and exhausted from the chambers A, B and C with the result that uniform reciprocatory motion is imparted to the diaphragm which, in turn, results in driving the mechanism which governs the timed rotation of the valve.

The shaft 29 is provided with a worm 54 which meshes with a worm gear 55 fixed upon an index shaft 56, which shaft leads to the index casing 57 arranged at one side of the compartment D. Within the index there is mounted the customary registering or recording devices employed in connection with meters of this type.

Since the compartment D contains gas at all times I extend a relatively small shaft 58 through an elongated but plain bearing 59 formed in the inner wall of the casing 57. The length of the bearing 59 and the fact that there is a close relationship between the diameter of the shaft and the inner diameter of the bearing enables me to operate the index without surrounding the shaft 58 with a stuffing box. The shaft 58 includes cranks 60 arranged on opposite sides of the bearing 59, which cranks compensate for unequal expansion and contraction in the shaft due to the inclusion of the small diametered portion thereof which is received within the bearing 59, this portion being of appreciable less diameter than the ends of said shafts 56.

This construction keeps out most of the gas from the index housing, but as an additional precaution, to prevent escape of gas to the atmosphere, I have covered the index with a heavy glass lens 61, which has its outer circular edges arranged between gaskets 62 which are compressed by a threaded tightening ring 63. The lens is protected by a pivoted door 64 arranged in the front of the index housing.

In view of the foregoing it will be seen that the present invention provides a meter wherein the use of stuffing boxes and the like has been completely eliminated and the arrangement of the parts rendered such as to minimize friction. In this manner I have succeeded in producing a meter which will be extremely sensitive to low operating pressures and which meets quite effectively the present day demand for an iron case meter which will operate satisfactorily at a low pressure. Another feature of the meter resides in the formation or mounting of the diaphragm to prevent the leather part thereof from coming into contact with materials other than gas in order that the leather will be protected from deteriorating influences; consequently a meter of long life is provided.

While I have described what I consider to be the preferred form of the present invention, it will be understood that the invention is not limited specifically to this single embodiment of my invention but may be expressed in other forms without departing from the spirit and principles of the invention as the latter is set forth in the following claims.

What is claimed is:

1. In a gas meter, a casing formed to include adjacent but separate valve and index compartments, valve and index mechanism located respectively within said compartments, a divisional wall separating these compartments, a shaft drive from said valve mechanism for effecting the operation of the index mechanism, said shaft being of needle-like form, and a packingless plain bearing formed in the divisional wall and extending laterally therefrom, adapted for the reception of said shaft.

2. In a gas meter, a casing having an index compartment and a valve compartment, valve and index mechanism located respectively within said compartments, a wall separating the two compartments, an elongated plain bearing formed in said wall, an index shaft of needle-like form journaled for rotation within said bearing and extending into both of said compartments, and a gas tight transparent closure for said index compartment.

In testimony whereof I affix my signature.

HOMER J. WADDELL.